Sept. 2, 1969   F. R. GLADWIN   3,464,314
METHOD AND APPARATUS FOR MILLING LARGE RADIUS CURVES
Filed July 6, 1967   3 Sheets-Sheet 1

INVENTOR
FLOYD R. GLADWIN

BY Gillen, Homan, & Canton

ATTORNEYS

Sept. 2, 1969  F. R. GLADWIN  3,464,314
METHOD AND APPARATUS FOR MILLING LARGE RADIUS CURVES
Filed July 6, 1967  3 Sheets-Sheet 2

INVENTOR
FLOYD R. GLADWIN

BY Cullen, Sloman, & Cantor
ATTORNEYS

Sept. 2, 1969  F. R. GLADWIN  3,464,314
METHOD AND APPARATUS FOR MILLING LARGE RADIUS CURVES
Filed July 6, 1967  3 Sheets-Sheet 3
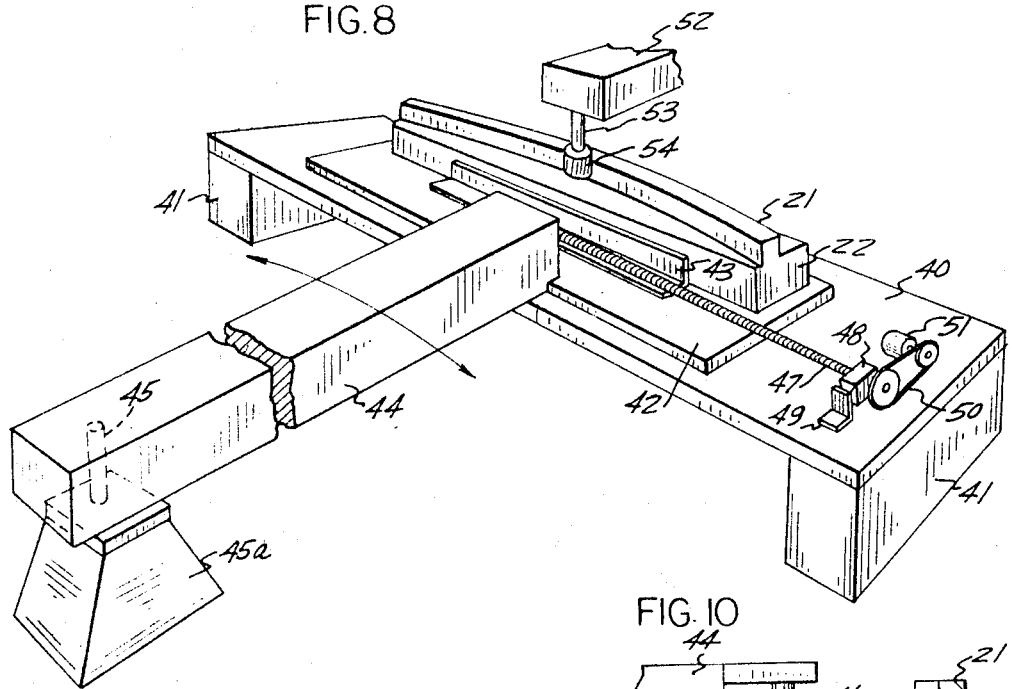
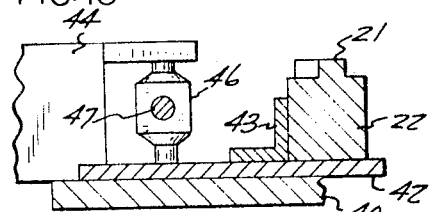
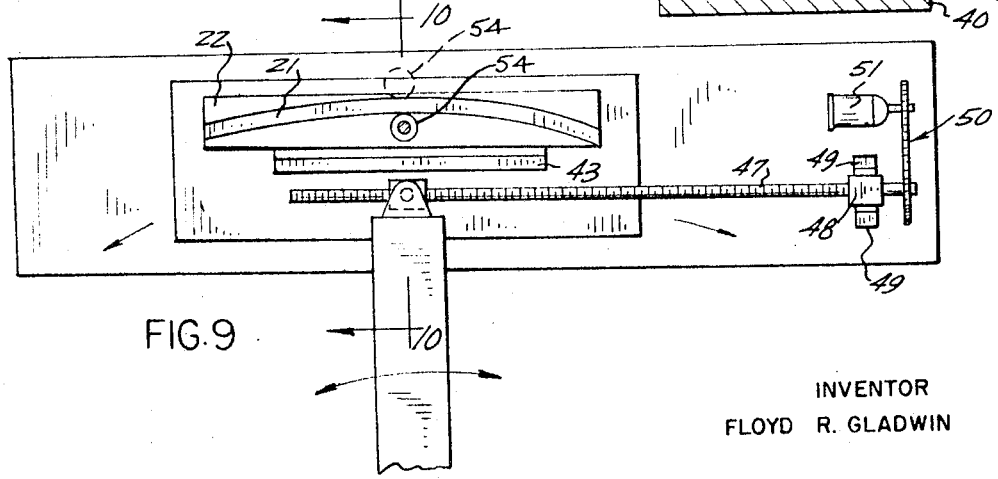
INVENTOR
FLOYD R. GLADWIN
BY Cullen, Sloman, & Cantor
ATTORNEYS

United States Patent Office 3,464,314
Patented Sept. 2, 1969

3,464,314
METHOD AND APPARATUS FOR MILLING
LARGE RADIUS CURVES
Floyd R. Gladwin, Grosse Ile, Mich.
(14500 Eureka St., Southgage, Mich. 48195)
Filed July 6, 1967, Ser. No. 651,471
Int. Cl. B23c 9/00, 1/00, 3/00
U.S. Cl. 90—21                                   4 Claims

ABSTRACT OF THE DISCLOSURE

A method and apparatus for milling large radius curves upon a workpiece, using a horizontal spindle milling machine, including first, accurately milling a pair of radius curved guide rails and two corresponding pairs of curved guide bushings by securing them upon the free end of a vertically pivoted, horizontally swingable beam of the desired radius and swinging the free end in the path of a vertical spindle milling machine cutter and, thereafter, mounting said rails upon the bed of a horizontal milling machine and said guide rails upon a horizontally movable table carrying the workpiece, then reciprocating the table in the curved path defined by the rails and bushings, beneath a horizontal spindle milling cutter for cutting a corresponding large radius curve upon the workpiece.

BACKGROUND OF INVENTION

For certain manufacturing purposes there are requirements for large, plate-like members having a precisely dimensioned curved face whose curvature corresponds to a segment of a large radius circle. For example, dies used in continuous casting of metal ingots may be formed on the order of two feet or so in length and approximately one foot in width with a large surface forming a segment of a circle having a radius of approximately 40 feet. This is illustrative of a type of industrial part which has been extremely difficult to manufacture, particularly where precision has been required.

Conventional milling cutters are ideally suited by the nature of their cutting operations for producing such types of curved faces on plate-like workpieces. However, such machines, due to their rectilinear feed movement, have not been usable for this purpose except by considerable reconstruction and adaptation, changing it from a conventional machine.

SUMMARY OF INVENTION

Hence, it is a primary object of this invention to provide a method and apparatus for quickly and inexpensively and temporarily adapting a conventional, horizontal spindle milling machine for cutting large radius curves upon plate-like workpieces. The invention contemplates providing a means for moving the milling machine table, beneath the cutter, in a curved path, corresponding to the radius of curvature to be formed upon the workpiece.

This invention further contemplates apparatus for the manufacture of a means for guiding the milling machine work table, such means being in the form of curved guide rails and guide bushings which must be manufactured first, before the milling machine may be used for manufacturing the workpiece.

Summarizing, this invention contemplates providing a simple, inexpensive, yet accurate apparatus in the form of a horizontally swingable beam, upon whose free end may be mounted, one by one, guide rails and guide bushings for cutting by a conventional vertical spindle milling machine, to thereby accurately form the means for converting a horizontal spindle milling machine table for curvilinear movement. Thereafter, the rails and guide bushings and related equipment are simply attached to the movable table and fixed bed of a horizontal spindle milling machine for thereby providing curvilinear movement of the workpiece in the path of a horizontal spindle cutter.

The first mentioned apparatus, namely the swinging beam apparatus, is capable of producing a limited number of accurate curved, long and narrow pieces. After a short period of use, it is unable to reproduce close tolerances and therefore it is used solely to produce what amounts to tools or templates, namely, the guide rails and guide bushings which in turn are then used in the horizontal spindle milling machine which is capable of reproducing required tolerances for many pieces.

DESCRIPTION OF DRAWINGS

FIG. 8 is a schematic view of the apparatus for forming the rails and guide bushings.

FIG. 9 is a plan view of the apparatus of FIG. 8, and

FIG. 10 is an enlarged view taken in the direction of arrows 10—10 of FIG. 9.

DETAILED DESCRIPTION

Apparatus for cutting workpiece—FIGS. 1–5

Figure 1:
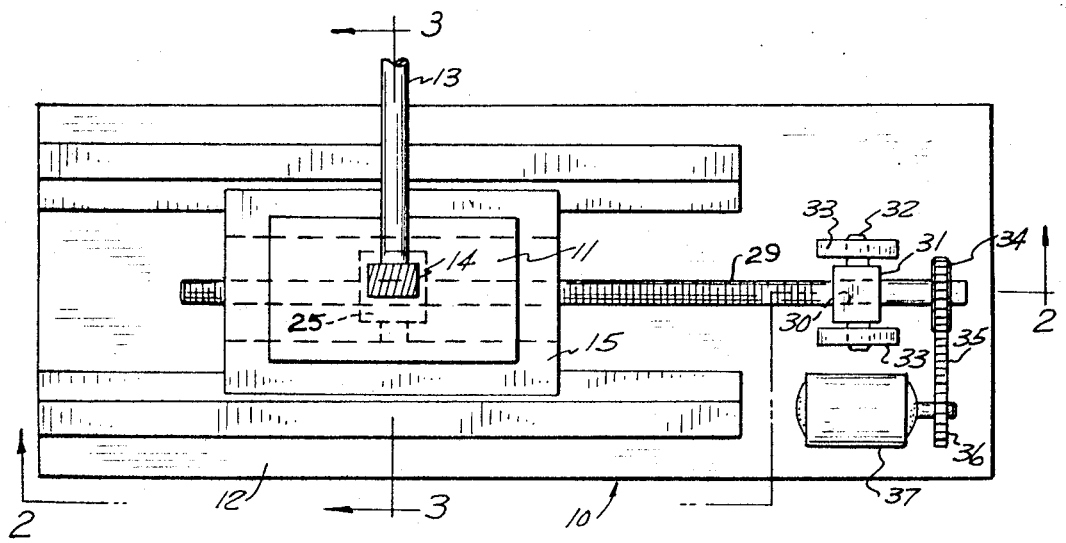
FIG. 1 is a plan view of the apparatus used for milling the workpiece upon a horizontal spindle milling machine.
Figure 2:
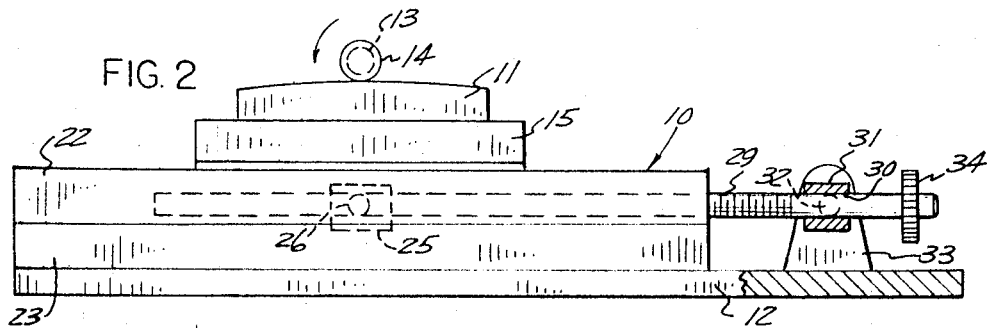
FIG. 2 is an elevational view taken in the direction of arrows 2—2 of FIG. 1.
Figure 3:
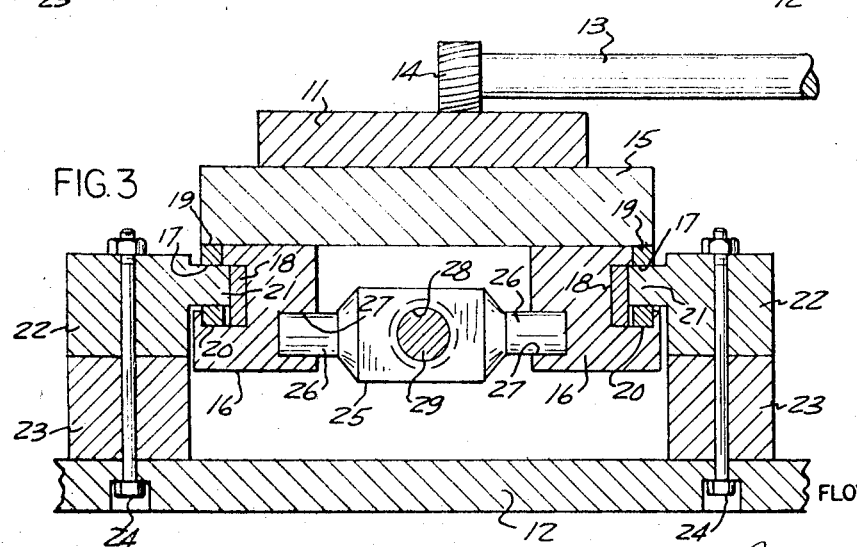
FIG. 3 is an enlarged cross-sectional view taken in the direction of arrows 3—3 of FIG. 1.

FIGS. 1–3 illustrate the apparatus 10 for milling a large radius, curved surface upon a plate-like workpiece 11. The apparatus includes the bed or support plate 12 of a conventional horizontal spindle milling machine whose spindle 13 and cutter 14 are illustrated in the drawings. The milling machine itself is not illustrated since it is conventional and forms no part of this invention.

The workpiece 11 is removably secured as by bolts or clamps, in the conventional manner, to movable table 15 to which are secured guide bars 16 (see FIG. 3). The guide bars are provided with outer grooves 17 which are formed with a lining comprising an inner bushing strip 18, an upper bushing strip 19 and a lower bushing strip 20. Each of said grooves 17 receives a rail 21 formed on a way 22 which is carried by a spacer bar 23 and secured by bolts 24 to both the spacer bar and the bed 12.

Figure 4:
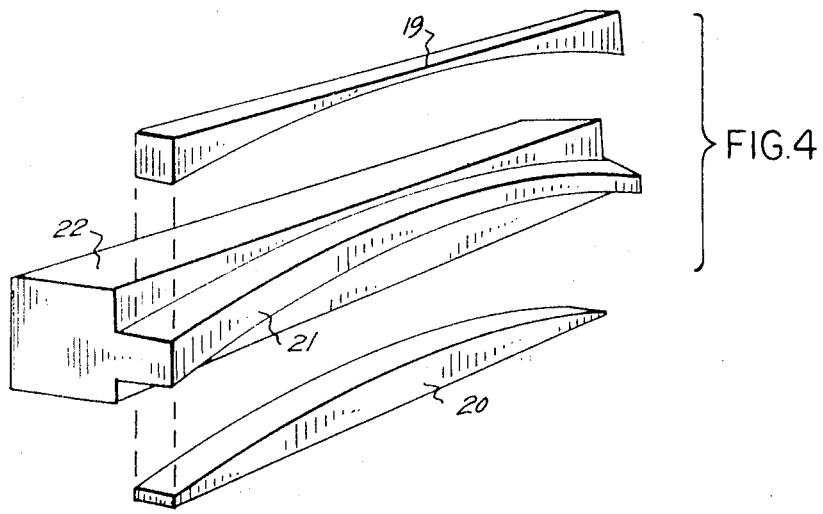
FIG. 4 is an enlarged, disassembled, perspective view of a rail with its upper and lower guide bushings.

Referring to FIG. 4, the rails are curved to form a segment of the circle having a radius corresponding to the radius of the workpiece finished surface. Correspondingly, the guide bar grooves 17 are curved to receive the rails, with the curvature being obtained by means of curving the lower surface of the upper bushing strip 19 and the upper surface of the lower bushing strip 20. The non-curved faces of the bushing strips are flat and straight so that cutting the grooves in the guide bars 16 does not involve cutting curves, but rather straight edges to receive the two bushings. Likewise, the inner bushing strips 18 are simply flat strips which are not curved, since they are arranged for contacting the inner, flat surfaces of the rails.

Figure 5:
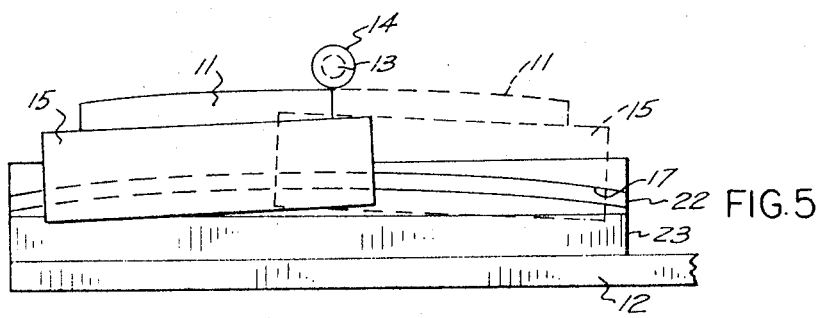
FIG. 5 is a schematic view showing the workpiece and its supporting table moved into two opposite extreme positions.

As shown schematically in FIG. 5, the table 15 is arranged to reciprocate, that is, move back and forth horizontally, but its travel, due to the curved shape of the rails and bushing strips, is along an arc defined by the radius of the workpiece finished surface.

In order to move the table back and forth, a trunnion 25 (see FIG. 3) is formed with studs 26 rotatably received in holes 27 formed in the guide bars. The trunnion is provided with a central threaded opening 28 to receive a threaded drive screw 29 whose opposite end passes through an opening 30 in an outer trunnion 31 whose studs are rotatably supported within bracket supports 33 mounted upon the bed 12.

A sprocket 34 mounted on the end of the drive screw is connected by a chain 35 to a motor sprocket 36 mounted upon a reversible, variable speed motor 37.

Operation—FIGS. 1–5

In operation, the workpiece 11 is secured to the upper surface of the table 15, beneath the horizontally axised cutter 14 which is rotated by the conventional milling machine construction. The table is reciprocated back and forth by means of regularly reversing the direction of rotation of the motor 37. As the table reciprocates, it moves along a curvilinear path beneath the cutter to thereby cut the surface of the workpiece in a curved form. By axial movement of the cutter spindle 13, the cutter is able to make successive passes over the entire workpiece or over those parts of the workpiece which are to be curved.

The entire apparatus described above, may be easily assembled upon and easily removed from the conventional horizontal spindle milling machine so that it may be used only as needed, without otherwise changing the structure or operation of the milling machine.

The workpiece, while shown as being centered upon the table, may at times be fastened off center relative to the table, that is, more to the left or right. Hence, while the surface of the finished workpiece will correspond to a segment of an arc, the workpiece will not be symmetrical so that it may be thicker at one end than at the other, thereby providing special curved surfaces as might be needed for various industrial purposes.

Concave surface workpiece

Figures 6, 7:
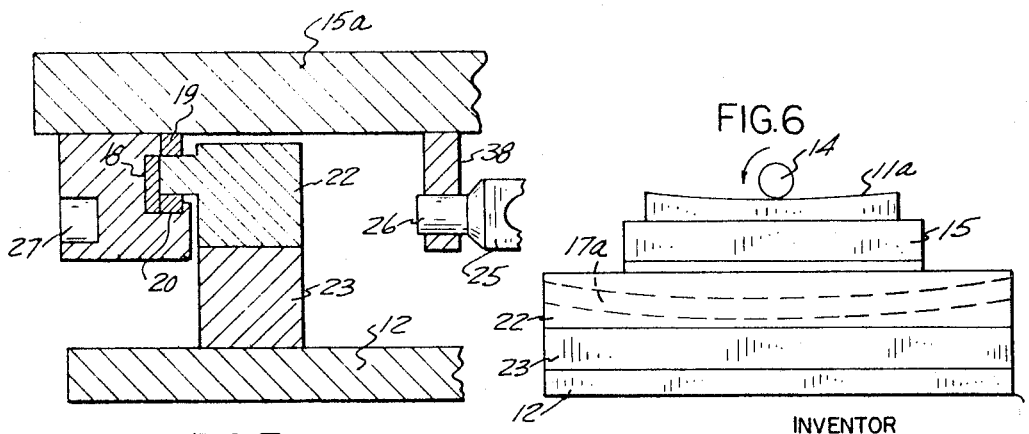
FIG. 6 is a schematic view showing a workpiece with a concave surface, as contrasted with the convex surface of FIG. 2.
FIG. 7 illustrates a modification of the arrangement of the support parts for the movable table.

FIG. 6 shows schematically the cutting of a concave workpiece surface, as contrasted with the convex surface illustrated in FIGS. 1–5. The structure and operation and apparatus are identical with the exception that the rails and the guide bushings are reversely arranged so that they form an upwardly concave groove 17a, as illustrated schematically in FIG. 6. The workpiece 11a, is otherwise handled and treated in the same manner as described above.

Modification—FIG. 7

In order to accommodate a larger workpiece, it is desirable to be able to use a larger, that is, wider table. Hence, FIG. 7 illustrates the use of a wider table 15a, merely by reversing the positions of the guide rails so that they open outwardly rather than toward each other. Here the guide bars are arranged on the outside of the guide rails thus supporting a much wider table. In order to properly support the trunnion 25, suitable brackets 38 may be secured, as by welding, to the bottom of the table 15a. Thus, the trunnion here, as in the case of FIG. 3, permits curvilinear movement of the table relative to the straight drive screw.

Apparatus for cutting rails and guide bushings—
FIGS. 8–10

In order to provide precision workpiece surfaces, it is obviously important to have precisely dimensioned rails and guide bushings. Separate apparatus is provided for this purpose.

Thus, referring to FIGS. 8–9, this apparatus comprises a base table 40, mounted upon supports 41, upon which is slidably rested a slide plate 42 to which an angle bar 43 is fastened. In the illustration shown, an unfinished way 22 is fastened upon the slide plate 42, against the angle bar 43, with its rail 21 extending upwardly.

The way may be suitably clamped to the angle support 43 and the slide plate 42, as by means of bolts or clamps or other conventional means. The slide plate, in turn, is fastened to the free end of a horizontally swingable beam 44 which is pivoted at 45 upon a suitable support 45a, which preferably is horizontally adjustable for accurate positioning the pivot 45.

The beam may be made in any number of conventional ways, but it must be extremely rigid and precisely dimensioned in length to provide a radius corresponding to the workpiece radius. For example, it may have the length of approximately 40 feet in order to ultimately provide a 40 foot radius for the workpiece finished surface.

A trunnion 46 (see FIG. 10) is secured to the end of the beam and to the slide plate 42 and its central threaded opening receives a drive screw 17 whose outer end passes through an outer trunnion 48 supported by brackets 49 upon the base table. The other end of the drive screw is connected by a chain and sprocket arrangement 50 to a reversible, variable speed motor 51.

The base table 40 is arranged beneath and may actually be a part of a conventional vertical spindle milling machine 52 having a vertical spindle 53, carrying a cutter 54.

In operation, the slide plate, with the guide rail fastened thereto, swings in a horizontal arc by sliding upon the base table 40 and with the arc being defined by the beam which acts as the radius of the arc. The curved rail therefore is moved relative to the rotating cutter 54 to thereby accurately cut the rail curve.

The same process is repeated to produce the curved surfaces on the guide bushings 19 and 20.

It happens that the foregoing apparatus, while accurate, requires more time and effort to produce identical parts than does the apparatus of FIGS. 1–5. In addition, it is not feasible for use at all on large plate-like workpieces. Hence, the apparatus here is used at its optimum, namely to produce the rails and bushings which in effect then form tools or templates for use in the horizontal spindle milling machine which, in turn, then produces the curved workpiece surfaces.

SUMMARY OF METHOD

Summarizing, the method herein comprises first forming a beam of the required length for use on the apparatus of FIGS. 8–9. Then, the rails and guide bushings are cut upon the vertical spindle milling machine shown in FIG. 8.

Thereafter, these rails and bushings are properly mounted within the apparatus shown in FIGS. 1–3, in order to provide curvilinear motion for the horizontally moving table of the horizontal spindle milling machine. This, in turn, is used for producing the large radius curved surfaces upon the workpiece to the precision required.

This invention may be further developed within the scope of the following claims. Accordingly, it is desired that the foregoing description be read as being merely illustrative of an operative embodiment of this invention and not in a strictly limited sense.

Having fully described an operative embodiment of this invention, I now claim:

1. Apparatus for milling large radius curves upon a surface of a large, plate-like workpiece, on a conventional horizontal spindle milling machine having a horizontal bed plate, comprising a pair of spaced-apart curved rails secured to said bed plate;

a table located above the bed plate and having curved grooves formed beneath the table for receiving said rails;

said rails and grooves being curved along the arc of a circle, corresponding to the curvature of the workpiece surface;

means for reciprocating the table upon the bed plate for thereby moving the table in a curvilinear path, defined by the arc of a circle, corresponding to the workpiece surface, beneath the milling cutter.

2. A construction as defined in claim 1, and said grooves opening generally horizontally;

the said rails extending into said grooves in a generally horizontal direction.

3. A construction as defined in claim 2, and said grooves each being straight and having an upper and a lower guide bushing arranged therein for contacting the upper and lower surfaces of the rail respectively;

the faces of the bushings in contact with the rails being correspondingly curved, and the opposite faces of the bushings being straight and flat for seating against the groove walls;

with the curved faces of the bushings thus forming the curved shape of the rail receiving groove.

4. A construction as defined in claim 3, and said means for reciprocating the table comprising a drive screw threadedly engaged within a threaded opening in a trunnion mounted upon the bottom of a table for rotation in a horizontal plane;

the opposite end of the screw being powered by a drive motor for rotating the screw in opposite directions for thereby moving the table.

References Cited
UNITED STATES PATENTS

| | | | |
|---|---|---|---|
| 1,125,566 | 1/1915 | Lang | 90—58 |
| 2,334,787 | 11/1943 | Olander | 90—18 |

GERALD A. DOST, Primary Examiner

U.S. Cl. X.R.

90—11, 12, 58